(12) United States Patent
Srivastava et al.

(10) Patent No.: US 9,542,216 B2
(45) Date of Patent: Jan. 10, 2017

(54) RICHER MODEL OF CLOUD APP MARKETS

(71) Applicants: AT&T Intellectual Property I, LP, Atlanta, GA (US); Rutgers, The State University of New Jersey, New Brunswick, NJ (US)

(72) Inventors: Abhinav Srivastava, Edison, NJ (US); Vinod Ganapathy, Bridgewater, NJ (US)

(73) Assignees: AT&T INTELLECTUAL PROPERTY I, L.P., Atlanta, GA (US); RUTGERS, THE STATE UNIVERSITY OF NEW JERSEY, New Brunswick, NJ (US)

( * ) Notice: Subject to any disclaimer, the term of this patent is extended or adjusted under 35 U.S.C. 154(b) by 270 days.

(21) Appl. No.: 14/054,430

(22) Filed: Oct. 15, 2013

(65) Prior Publication Data

US 2015/0106803 A1   Apr. 16, 2015

(51) Int. Cl.
*G06F 9/455* (2006.01)
*G06F 9/50* (2006.01)
*G06F 9/445* (2006.01)

(52) U.S. Cl.
CPC ........... *G06F 9/45558* (2013.01); *G06F 9/455* (2013.01); *G06F 9/4555* (2013.01); *G06F 9/45533* (2013.01); *G06F 9/45545* (2013.01); *G06F 9/50* (2013.01); *G06F 8/60* (2013.01); *G06F 2009/45566* (2013.01); *G06F 2009/45587* (2013.01); *G06F 2009/45591* (2013.01)

(58) Field of Classification Search
None
See application file for complete search history.

(56) References Cited

U.S. PATENT DOCUMENTS

| | | |
|---|---|---|
| 8,341,625 B2 | 12/2012 | Ferris et al. |
| 8,370,838 B1 | 2/2013 | Omelyanchuk et al. |
| 8,392,838 B2 | 3/2013 | Chawla et al. |
| 8,468,455 B2 | 6/2013 | Jorgensen et al. |
| 8,516,137 B2 | 8/2013 | Calder et al. |
| 9,292,317 B2 * | 3/2016 | Chen ........................ G06F 9/455 |
| 2009/0300641 A1 | 12/2009 | Friedman et al. |

(Continued)

FOREIGN PATENT DOCUMENTS

| | | |
|---|---|---|
| CN | 102915255 A | 2/2013 |
| EP | 2583211 A2 | 4/2013 |
| WO | WO2012130288 A1 | 10/2012 |

OTHER PUBLICATIONS

Amazon Machine Images (AMIs); http://aws.amazon.com/amis; pp. 1-17.

(Continued)

*Primary Examiner* — Charles Swift

(57) ABSTRACT

In a cloud app market, a cloud infrastructure customer can purchase apps for performing services such as rootkit detection and network security for a customer virtual machine run by the cloud infrastructure customer. A cloud infrastructure provider executes a provider virtual machine monitor or hypervisor on cloud infrastructure. The cloud app is provided with a customer virtual machine monitor nested on the provider virtual machine monitor. The customer virtual machine, together with a nested management domain of the customer, execute on the customer virtual machine monitor.

18 Claims, 4 Drawing Sheets

(56) References Cited

U.S. PATENT DOCUMENTS

| | | | |
|---|---|---|---|
| 2010/0131624 A1 | 5/2010 | Ferris | |
| 2010/0251328 A1 | 9/2010 | Syed et al. | |
| 2011/0072428 A1* | 3/2011 | Day, II | G06F 9/45558 718/1 |
| 2011/0093847 A1 | 4/2011 | Shah | |
| 2011/0126275 A1 | 5/2011 | Anderson et al. | |
| 2011/0214124 A1 | 9/2011 | Ferris | |
| 2011/0251992 A1 | 10/2011 | Bethlehem et al. | |
| 2011/0258621 A1 | 10/2011 | Kern | |
| 2011/0265164 A1 | 10/2011 | Lucovsky et al. | |
| 2011/0289555 A1 | 11/2011 | DeKoenigsberg et al. | |
| 2012/0167081 A1 | 6/2012 | Sedayao et al. | |
| 2012/0216187 A1* | 8/2012 | Ben-Yehuda | G06F 9/45558 718/1 |
| 2012/0226789 A1* | 9/2012 | Ganesan | G06F 9/5061 709/223 |
| 2012/0227037 A1 | 9/2012 | Chang | |
| 2012/0304170 A1 | 11/2012 | Morgan | |
| 2012/0317569 A1* | 12/2012 | Payne, Jr. | G06F 21/53 718/1 |
| 2013/0036470 A1* | 2/2013 | Zhu | H04L 63/0227 726/23 |
| 2013/0132956 A1 | 5/2013 | Ashok et al. | |
| 2013/0145363 A1* | 6/2013 | Eidus | G06F 9/45541 718/1 |
| 2013/0185715 A1 | 7/2013 | Dunning et al. | |
| 2013/0227550 A1* | 8/2013 | Weinstein | G06F 9/45558 718/1 |
| 2013/0227563 A1 | 8/2013 | McGrath | |
| 2014/0053272 A1* | 2/2014 | Lukacs | G06F 21/53 726/24 |
| 2014/0208111 A1* | 7/2014 | Brandwine | H04L 63/0428 713/171 |
| 2014/0282539 A1* | 9/2014 | Sonnek | G06F 9/45558 718/1 |
| 2014/0310796 A1* | 10/2014 | Lee | H04L 63/02 726/13 |
| 2015/0033227 A1* | 1/2015 | Lin | G06F 21/55 718/1 |

OTHER PUBLICATIONS

LibVMI; vmitools—Virtual Machine Introspection Tools—Google Project Hosting; http://code.google.com/p/vmitools; pp. 1-2.
MiniOS; http://sourceforge.net/projects/minios/; pp. 1-2.
The Cloud Market; http://thecloudmarket.com/; pp. 1-2.
TinyLinux; http//tiny.seul.org/en/; pp. 1-2.
M. Ben-Yahuda, M.D. Day, Z. Dubitsky, M. Factor, N. Har'El, A. Gordon, A. Liguori, O. Wasserman, and B. Yassour; "The Turtles project: Design and Implementation of Nested Virtualization". In OSDI, 2010; pp. 1-14.
Sven Buglel, Stefan Nurnberger, Thomas Poppelmann, Almad-Reza Sadeghi, and Thomas Schneider. "Amazonia: When Elasticity Snaps Back". In ACM CCS, 2011.
S. Butt, A. Lagar-Cavilla, A. Srivastava, and V. Ganapathy., "Self-service Cloud Computing". In ACM CCS, 2012.
Christopher Clark, Keir Fraser, Steven Hand, Jacob Gorm Hansen, Eric Jul, Christian Limpach, Ian Pratt, and Andrew Warfield. "Live Migration of Virtual Machines". In USENIX, NSDI, 2005.
T. Garfinkel and M. Rosenblum; "A Virtual Machine Introspection Based Architecture for Intrusion Detection". In NDSS, 2003.
B. Kauer, P. Verissimo, and A. Bessani; "Recursive Virtual Machines for Advanced Security Mechanisms". In DCDV, 2011.
L. Litty, H. A. Lagar-Cavilla, and D. Lie. Hypervisor Support for Identifying Convertly Executing Binaries. In USENIX Security, 2008.
Bryan D. Payne, Martim Carbone, and Wenke Lee; "Secure and Flexible Monitoring of Virtual Machines". In ACSAC, Dec. 2007.
A. Srivastava and J. Giffin; "Tamper-resistant, Application-aware Blocking of Malicious Network Connections" In RAID, Sep. 2008.
A. Srivastava, Himanshu Raj, J. Giffin, and Paul England; "Trusted VM Snapshots in Untrusted Cloud Infrastructures". In RAID, 2012.
Jinpeng Wei, Xiaolan Zhang, Glenn Ammons, Vasanth Bala, and Peng Ning: "Managing Security of Virtual Machine Images Ina Cloud Environment". In CCSW, 2009.
D. Williams, H. Jamjoom, and H. Weatherspoon; "The Xen-Blanket: Virualize Once, Run Everywhere"; In ACM EuroSys, Apr. 2012.
Sapuntzakis, Constantine P., et al, "Virtual Appliances for Deploying and Maintaining Software," LISA, vol. 3, 2003.
Sundararaj, Ananth I., Peter A. Dinda, "Towards Virtual Networks for Virtual Machine Grid Computing," Virtual machine research and technology symposium, 2004.
Bradshaw, R., et al, "A scalable approach to deploying and managing appliances," TeraGrid Conference, 2007.
Dastjerdi, Amir Vahid, Sayed Gholam Hassan Tabatabaei, Rajkumar Buyya, "An effective architecture for automated appliance management system applying ontology-based cloud discovery," Cluster, Cloud and Grid Computing (CCGrid), 2010 10th IEEE/ACM International Conference, IEEE, 2010.
Kecskemeti, Gabor, et al, "An approach for virtual appliance distribution for service deployment," Future Generation Computer Systems 27.3 (2011): 280-289.

* cited by examiner

RICHER MODEL OF CLOUD APP MARKETS

STATEMENT REGARDING FEDERALLY SPONSORED RESEARCH OR DEVELOPMENT

This invention was made with government support under grants CNS-0831268, CNS-0915394 and CNS-0952128 awarded by the National Science Foundation. The government has certain rights in the invention.

TECHNICAL FIELD

The present disclosure relates to commercially available virtual machines for cloud computing. More specifically, the disclosure is directed to the structuring of those virtual machines to better meet the needs of a cloud computing customer.

BACKGROUND

Major cloud providers have recently been building cloud markets, which serve as a hosting platform for virtual machines (VMs) pre-installed with a variety of software stacks. Customers of cloud computing providers leverage such markets by downloading and instantiating the VMs that best suit their computing needs, thereby saving the effort needed to configure and build VMs from scratch.

Customers' ability to link VMs to interact, such as by adding security tool VMs or other utilities to a work VM, is disallowed. Instead, each virtualized platform has one privileged VM (also called the management VM), controlled by the cloud provider, that supervises the execution of customer VMs. The management VM oversees all I/O from customer VMs, and completely isolates VMs from each other. While such isolation is desirable across VMs of different customers, it also prevents VMs belonging to the same customer from interacting in useful ways.

SUMMARY

In an exemplary embodiment of the present invention, there is provided a method for implementing a cloud-based app market. In the method, a cloud infrastructure provider provides a customer virtual machine monitor for use by a cloud infrastructure customer in executing a work virtual machine and in executing a management virtual machine. The customer virtual machine monitor is nested on a provider virtual machine monitor, the management virtual machine permitting implementation of privileged services by the cloud infrastructure customer.

The cloud infrastructure provider further provides, for instantiation by the cloud infrastructure customer, a virtual machine app for execution on the customer virtual machine monitor. The virtual machine app has privileges for accessing privileged information from a work virtual machine under control of the cloud infrastructure customer. The virtual machine app contains a virtual machine app operating system separate from the work virtual machine operating system, and the virtual machine app further contains instructions for performing a service based on the privileged information from the work virtual machine.

The virtual machine app may be a function of the management virtual machine.

The provider virtual machine monitor may provide hardware level support for nesting, in which case the customer virtual machine monitor executes on the provider virtual machine monitor. Alternatively, the provider virtual machine monitor may not provide hardware level support for nesting, in which case the customer virtual machine monitor executes on a second-level virtualization layer that executes on the provider virtual machine monitor and emulates privileged operations for the customer virtual machine monitor. The second-level virtualization layer may be a driver for interacting with paravirtualized device interfaces.

The instructions for performing a service based on the privileged information from the work virtual machine may comprise instructions for conducting two-way communication between the work virtual machine and the virtual machine app. In that case, the instructions may comprise instructions for performing a service selected from a group consisting of a checkpointing service, an antivirus service and an intrusion detection service.

The instructions for performing a service based on the privileged information from the work virtual machine may comprise instructions for operating on an output of the work virtual machine. In that case, the instructions may comprise instructions for performing a service selected from a group consisting of a forensic analysis service and a network security service.

The instructions for performing a service based on the privileged information from the work virtual machine may further comprise instructions for passing the privileged information from the virtual machine app to a second virtual machine app for performing an additional analysis.

Another aspect of the disclosure is computer readable media comprising one or more storage devices, the computer readable media having stored thereon computer readable instructions for execution by processors in a cloud infrastructure provided by a cloud infrastructure provider, wherein execution of the computer readable instructions causes the processors to perform operations that include instantiating a customer virtual machine monitor nested on a provider virtual machine monitor, wherein a customer work virtual machine is being configured to execute on the customer virtual machine monitor.

Execution of the instructions also causes the processor to instantiate a management virtual machine executing on the customer virtual machine monitor, the management virtual machine permitting implementation of privileged services by a cloud infrastructure customer; and causes the processor to instantiate a virtual machine app for execution on the customer virtual machine monitor, the virtual machine app having privileges for accessing privileged information from a work virtual machine under control of the cloud infrastructure customer, the virtual machine app containing a virtual machine app operating system separate from the work virtual machine operating system, the virtual machine app further containing instructions for performing a service based on the privileged information from the work virtual machine.

DETAILED DESCRIPTION OF EXEMPLARY EMBODIMENTS

Figure 1A:
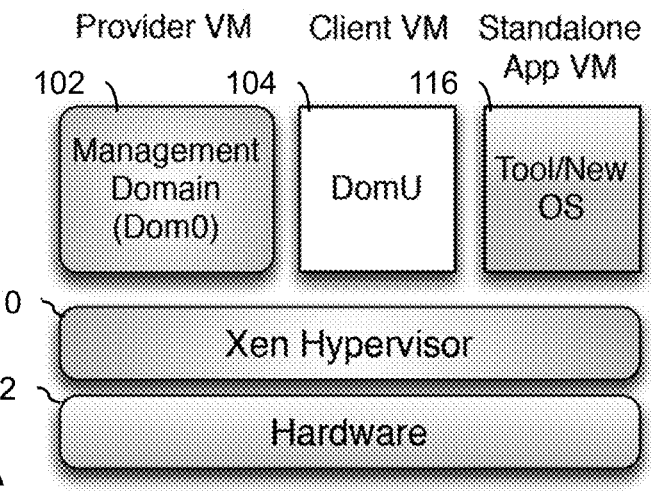
FIG. 1A is a schematic diagram illustrating the overall architecture of a current stand-alone VM app.

A richer model of cloud markets is disclosed, in which VM apps are available to interact with customer VMs in a rich set of ways to provide a number of services that are currently supported only by cloud providers. For example, customers can use VM apps to deploy virtual machine introspection-based security tools and various network middleboxes on their work VMs without requiring the cloud provider to deploy these services on their behalf.

As used herein, the term "cloud computing customer" or "customer" refers to an entity that utilizes cloud platform services provided by a clout platform services provider. A cloud computing customer runs, or causes to be run, a customer VM on cloud computing resources. The customer VM typically performs some business or other function for the customer.

Infrastructure-as-a-Service (IaaS) cloud platforms such as Amazon EC2® Web service and Windows Azure® Web service offer customers full access to virtual machines (VMs) whose software stacks they can customize and configure according to their needs. Enterprise-level customers with complex computing needs can clearly benefit from such flexibility. Customers, however, often have standard computing needs (e.g., they may simply want to host a Web server on the cloud), and may lack the resources and expertise to set up and configure VMs from scratch. That problem has motivated major cloud players to build cloud markets to distribute VMs pre-installed with software stacks that address the needs of such customers.

In a cloud market, cloud providers or third-party developers build VMs customized for a variety of standard workflows, and publish images of those VMs in the market. Customers simply choose the VMs to get started with their computing needs, thereby providing a more agile and hassle-free cloud computing experience. For example, Amazon allows publishers to create and publicly offer VM images, known as Amazon Machine Images (AMIs), that execute on Amazon EC2®. AMIs that offer a variety of standard software stacks (e.g. LAMP, or SQL database software) are now available, and customers can directly instantiate those standard software stacks to their specific domains. Publishers who create AMIs can also decide whether the AMIs must be paid or free.

The above notion of cloud markets is nascent, and cloud computing platforms can benefit from a richer model of "app stores" that are reminiscent of mobile app markets. Specifically, on current cloud markets, the notion of an app is restricted to VMs with different operating system versions, distributions, and other system or application software. Those VMs are stand-alone, and do not necessarily cooperate or interact with each other to support complex operations. This is in contrast to the current model of mobile app markets, where apps can interact with each other, and even reuse code modules of other apps.

As an illustration of the problem, security tools are offered as a cloud-based service. The security tools comprise a VM equipped with standard security tools such as network intrusion detection systems (NIDS), firewalls, and sophisticated malware detectors, such as those based on virtual machine introspection (VMI). To benefit from the tools offered by that VM on current cloud markets, customers are required to install their software stacks within the VM. The presently disclosed arrangement instead permits this security VM app to directly interact with the customer's work VMs (perhaps themselves downloaded from the cloud app market) to provide its services. For example, the security app VM must be able to monitor all incoming and outgoing network traffic from the customer VMs, filtering this traffic using its NIDS and firewall.

The presently disclosed cloud app market includes VM apps that implement standard utilities such as firewalls, NIDS, storage encryption, and VMI-based security tools. The included VM apps can also implement a host of other non-security-related utilities, such as packet shapers, memory and disk deduplication, and QoS tools. Customers can leverage those utilities by simply downloading the appropriate VM apps, and linking them suitably with their work VMs. The key challenge in realizing this arrangement on current cloud computing environments is that such interaction between VMs is disallowed by design.

The present disclosure expands on the concept of cloud app markets that support rich VM apps, and explores techniques for the implementation of VM apps. A taxonomy of VM apps is presented, ranging from simple standalone VM apps to VM apps that involve complex interactions with other VMs. The key requirements are presented to enable the discussed types of VM apps, and the design space of available options to implement those requirements is outlined.

Example VM Apps

Two examples are presented to demonstrate how security services can be implemented as VM apps: (1) VMI-based intrusion detection and (2) network security tools.

(1) VMI-based Intrusion Detection. To protect their work VMs from malicious software, customers of cloud computing can install antivirus software within their VMs. Such an approach can detect malicious software that operates at the user level. Attackers, however, are increasingly exploiting kernel-level vulnerabilities to install rootkits, which in turn allow them to remain stealthy and retain long-term control over infected machines.

To counter kernel-level malware, researchers have proposed a number of solutions inspired by VMI. In such solutions, the virtual machine monitor acts as the trusted computing base, and helps maintain the integrity of VMs that it executes. The security policy enforcer (e.g., a rootkit detector) itself operates within a privileged VM (i.e., the management VM), and checks the state of a target VM. To enable security enforcement, the virtual machine monitor fetches entities from the target VM (e.g., memory pages containing code or data) for inspection by the security policy enforcer. This architecture protects the enforcement engine from being tampered with by malicious target VMs.

VMI-based solutions proposed to date, however, are ideally suited for desktop virtualization because they require the security monitor to be installed within a privileged VM.

While this is trivially possible in desktop virtualization environments, it cannot be implemented in the cloud because it requires cooperation from cloud providers.

In the presently described approach, VMI-based intrusion detection tools such as rootkit detectors are implemented within a VM app. To use the app, a customer simply downloads the app, instantiates it, and permits the app to inspect the memory of its work VMs to detect attacks. The VM app model therefore permits customers to assign specific privileges to its VM apps, such as mapping memory pages of its work VMs into the VM app's address space.

(2) Network Security. Enterprises typically deploy a number of network security tools, such as firewalls, intrusion detection systems, and intrusion prevention systems, at the perimeter of networks to defend their in-house networks from attacks such as intrusions, denial-of-service (DoS), spam, and phishing, etc. Such deployment typically happens in the form of middleboxes. When an enterprise shifts its operations to public clouds, it must rely on the cloud provider to implement similar services on the enterprise's work VMs. VM apps provide enterprises the freedom to implement those services without having to rely on cloud providers.

As in the previous case, the enterprise simply downloads the network security VM app, instantiates it, and configures it to receive both incoming and outgoing network flows to its work VMs. That allows the enterprise to define and enforce arbitrary security policies flexibly, without relying on the cloud provider.

A Taxonomy of VM Apps

Figure 1B:
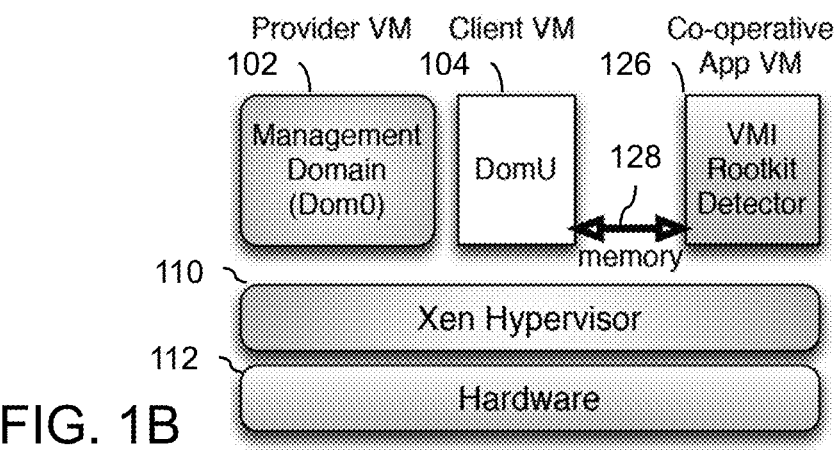
FIG. 1B is a schematic diagram illustrating the overall architecture of a cooperative VM app according to one embodiment of the disclosure.
Figure 1C:
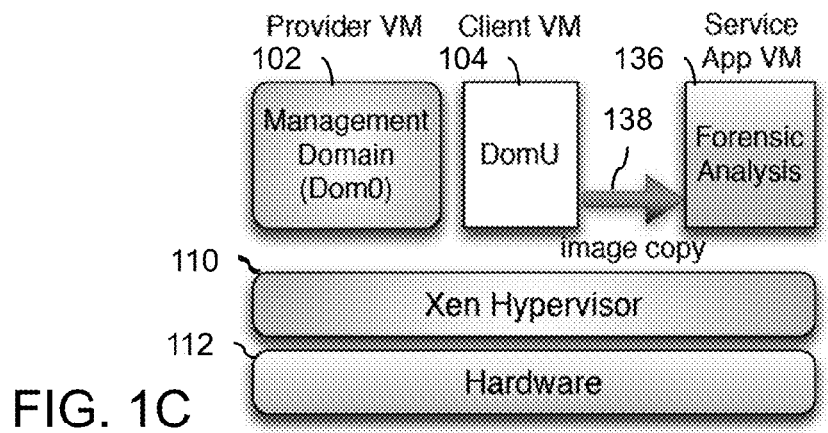
FIG. 1C is a schematic diagram illustrating the overall architecture of a service VM app according to one embodiment of the disclosure.

Referring to FIGS. 1A, 1B and 1C, a taxonomy of VM apps is presented based upon their functionality. VM apps are categorized into four groups: (1) standalone, (2) cooperative, (3) service and (4) bundled. In each of the illustrated categories, a Xen hypervisor 110, or another native hypervisor, is installed on hardware 112, allowing multiple operating systems to execute concurrently on the hardware 112. A management domain (or Dom0) 102 is the provider VM and functions as the host operating system with highest privileges. One or more customer work VMs (DomU) 104 are instantiations of VMs downloaded from the provider and are managed by the management domain 102.

Standalone VM Apps

A standalone VM app 116, shown in FIG. 1A, represents the kind of app that is currently available on cloud markets (e.g., AMI images available currently on Amazon's cloud market). The app 116 may include VMs with new operating system distributions, versions, or drivers supporting new hardware. Customers select VM apps, instantiate them, and build software and services atop the provided environment. These VM apps are self-contained and do not interact with the customer's VM 104.

To create a standalone VM app, a publisher configures and installs an OS along with one or more user-level tools customized for a specific workflow. For example, a web-server VM app will likely contain the entire Apache™ toolchain. Likewise, it is possible to imagine a security VM app that is pre-installed with user-space anti-virus tools. Customers that purchase such a VM app will benefit from the pre-installed anti-virus tools, thus saving them the effort of installing and configuring those tools themselves. The customers can simply install their enterprise software, which will automatically be protected by the anti-virus tools. Note that in the setting of standalone VM apps, a web-server VM app does not directly benefit from a security VM app because these VMs cannot interact with each other.

Cooperative VM Apps

As noted above, standalone VM apps do not interact with each other. The presently described vision of cloud app markets includes VM apps that can cooperate with each other. Such a cooperative VM app 126, shown in FIG. 1B, contains specialized software to be used on other customer VMs such as VM 104 (or VM apps), and can actively communicate with the customer VMs, as illustrated by the arrow 128. For example, a checkpointing VM app will cooperate with a customer VM to generate a snapshot of that VM. A cloud platform that supports cooperative VM apps will allow the creation of VMI-based intrusion detection apps, as outlined above. Since a cooperative VM app interacts with other customer VMs, often to perform privileged operations (e.g., checkpointing its state or inspecting the contents of its memory pages), the customer must assign specific privileges to it after instantiating it. The hallmark of cooperative apps is a two-way communication between the app and the customer's work VM. For example, the VM app may send a request to the customer VM to access to a particular page, and the customer VM would respond by giving it suitable access.

Service VM Apps

Service VM apps 136, shown in FIG. 1C, are those that are configured with specific tools and software that customers can use on their work VMs 104. Unlike cooperative apps, in which there is two-way communication between the VM app and the customer's work VM, service VM apps operate on the output 138 of the work VM 104. This category includes, for example, forensic analysis VM apps that can operate on the memory snapshot of the customer VM to conduct their analysis. It also includes network security VM apps, where the network output of a VM may need to be examined by the VM app. To use service VM apps 136, customers set up the I/O path so as to direct the output 138 of their work VM 104. Note that unlike standalone VM apps, which customers typically configure or extend, service VM apps are pre-installed with specific functionality (such as forensic analysis) that is executed on other VMs. Also, unlike cooperative VM apps, service VM apps do not require specific privileges to act upon other VMs because they only operate on the output of customer VMs (e.g., VM images or network output). As explained in more detail below, to use service VM apps, customers require the flexibility to create custom I/O channels.

Bundled VM Apps

Figure 2:
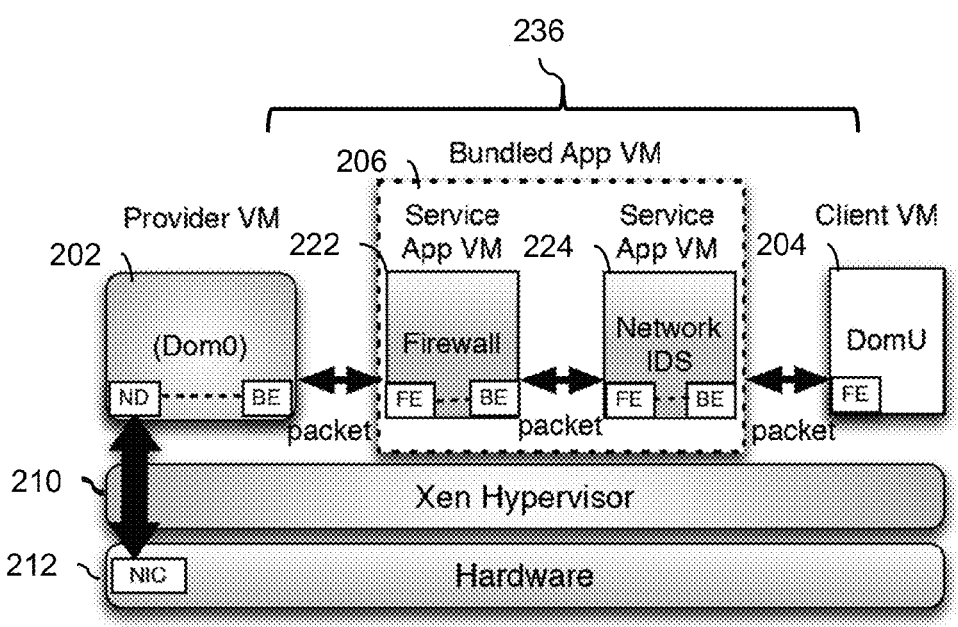
FIG. 2 is a schematic diagram illustrating the overall architecture of a bundled VM app and associated custom I/O according to one embodiment of the disclosure.

It is often beneficial to combine the functionality of multiple VM apps, and obtain a bundled VM app that composes the functionality of its constituent VM apps. A bundled app VM 206 is illustrated in FIG. 2, along with a custom I/O channel 236 connecting the customer's work VM 204 with the app VMs 222, 224 and the provider VM 202. The channel 236 includes front ends (FEs) and back-ends (BEs) of the linked VMs. The channel connects through the network driver (ND) of the provider VM 202 to a hardware network interface card (NIC).

Akin to the pipe primitive in operating systems, where the output of one command is input to another, in a bundled VM app, the output of one VM app is input to another. Individual VM apps inside a bundle could be standalone, cooperative, service VM apps, or themselves bundled apps.

Bundled VM apps are an ideal strategy for implementing and composing network services. For example, a customer interested in network security apps, such as intrusion detection systems and firewalls, downloads a network security app bundle. Upon instantiation of the bundle, all the service VM apps inside it will create a chain of services. In that case, the customer VM's packet will traverse the firewall, and then the NIDS, providing multiple layers of security. To realize the bundled VM app model, customers must fulfill the requirements of individual VMs in the bundle. For example: a bundle comprising cooperative and service VMs will require both necessary privileges and custom communication and I/O channels to carry out its task.

Requirements

The following is a description of the key requirements that must be satisfied to realize the cloud app markets and the kinds of VM apps discussed above.

Trustworthy Launch of VM Apps

A common requirement, irrespective of the type of VM app used by customers, is the ability to perform a trusted boot of the VM app. That is, the customer must be able to verify that the VM app booted correctly, with the same software stack as promised on the cloud market. That requirement is particularly important because customers will typically download VM apps from the cloud market based upon the advertised functionality of the app. Because the VM app will likely interact with the customer's work VMs, it is important for the customer to be able to validate that the operating system and applications running atop the VM app are as advertised by its creator. Such validation will establish the trustworthy launch of VM apps.

It is expected that validation of a trustworthy VM app launch can be performed using trusted computing technology. It is assumed that a hardware root of trust, such as a Trusted Platform Module (TPM) chip, is available on cloud hardware. Measurements are stored inside the TPM's Platform Configuration Registers (PCRs) and are recursively obtained by extending the PCR's contents with hashes of the software stack. A customer can verify trustworthy launch by verifying the measurement received from the platform using the expected hashes of the VM app.

Privilege Model

On today's cloud platforms, the cloud platform provider maintains full control over the computing platform. The management VM of each virtualized hardware platform controls access to physical hardware resources. Customers can modify their own VMs at will, but those VMs are themselves not privileged.

Services such as checkpointing, VM creation, and VM introspection-based security tools execute within the management VM. That domain is bestowed with privileges to inspect the memory contents and control I/O of customer VMs. Since the management VM is under the control of the cloud platform provider, customers must rely on cloud providers to adopt new tools and technologies and deploy them in the management VM.

The proposed cloud app market model aims to remedy that situation by putting customers in charge of deploying services on their own VMs. To realize that vision, the privileges that VM apps would need must be carefully considered. An example of such a VM app is a cooperative VM app, which interacts with other VMs belonging to the customer. For instance, a VMI-based introspection app would need privileges to map memory pages of the customer VM that it monitors. Such privileges are normally available only to the management VM. Since VM apps execute as user VMs, the privilege model of the cloud must be suitably modified to allow such operations. Further, that privilege model must be fine-grained; i.e., customers must be able to specify that a VM app be given specific privileges (over its memory pages, or I/O channels) over customer VMs.

As discussed below, it is possible to realize that privilege model in a number of ways, either by modifying the hypervisor, or using nested virtualization.

Preventing Information Leakage

VM apps are expected to interact with customer VMs, which may store and manipulate sensitive data. It is therefore crucial to ensure that VM apps do not leak sensitive data to their publishers or malicious third parties. Controlling information flow and preventing information leaks is a problem with a rich history, and a number of techniques have been developed in the research literature. The following is an examination of the potential for information leakage in various classes of VM apps.

Standalone VM apps typically contain software stacks for specific workflows. Customers can possibly extend standalone VMs to build full-fledged work VMs to achieve their computing needs. It is difficult to reason about information flow within standalone VMs, because controlling the flow of information in such VMs will likely require mechanisms both within the VM (e.g., to track sources of information flow, which may be domain-specific), as well as within the virtual machine monitor.

Cooperative and service VM apps interact with customer VMs, and can therefore access sensitive customer information. However, since these VM apps are specialized (unlike standalone VM apps, which can double as work VMs), customers can regulate how these VM apps externalize the data that they read from their work VMs. For example, the customer could disallow a VMI-based intrusion detection system from accessing the network or persistent storage, thereby preventing it from sending any sensitive data that it may read from the customer's VMs. On Xen, for instance, such control can be implemented using Xen grant tables. I/O on Xen happens via pagesharing: a VM that wishes to communicate with the outside world shares pages with the management VM to pass data to hardware. Xen grant tables can be used to specify that a particular VM should never be able to establish shared pages with the management VM, hence restricting I/O.

It is expected that such information flow controls would mitigate the risk of leakage of sensitive information. Completely eliminating the risk of information leakage, however, is still challenging. For example, it has been shown that some cloud VMs store sensitive customer data and do not erase it even when customers release the VM. To eliminate such threats, cloud infrastructure providers must offer image-cleaning services and/or control mechanisms.

Featherweight VM Apps

Standalone VM apps may often come pre-installed with fullfledged operating systems and user-level tools. That is because of the expectation that customers will typically extend these apps to create work VMs.

Cooperative and service VM apps, however, are often developed for a specific purpose, and need not run fullfledged operating systems and associated user-level utilities. For example, a cooperative app VM to create checkpoints need not run a complex operating system such as Linux or Windows®, and could instead utilize kernels such as MiniOS (available on-line at http://sourceforge.net/projects/minios/), and TinyLinux (available on-line at http://tiny.seu-l.org/en/) along with the user level software supporting the snapshotting service. Such apps are referred to herein as featherweight VM apps.

Featherweight VM apps will likely consume fewer resources on the cloud (memory, CPU cycles, I/O), and will therefore be more cost effective to customers. That is important because, on cloud markets, customers must pay both during the purchase of the VM app, and to execute the app on the cloud.

Standardized API Interface

Cloud platform providers such as Amazon® and Rackspace® offer API software development kits (SDKs) to aid the development of smart phone apps that access cloud resources. There are currently no such APIs for cloud app developers. To design the apps described above, developers will need support from cloud providers. For example, a VM introspection cloud app needs to interact with the cloud hypervisor to map customer VMs' memory pages. Although APIs exist for that purpose, access to them is restricted to the management VM. Similar interfaces are needed by cloud app developers. Cloud providers must expose some basic primitives to allow VM app developers to build using those primitives. An API SDK would be the best way for providers to expose their infrastructure to app developers.

Several classes of VM apps may also require a query interface. For example, a forensic VM app should be able to alert customers about the results of a scan of a memory image. Similarly, a NIDS VM should be able to disclose its findings to the customer. Given that each VM app implements different services, querying and obtaining results from each VM app will likely place a huge additional burden on customers.

To best implement the disclosed cloud app markets, it is therefore desirable that VM apps must also expose a standardized query API. Cloud providers can publish this API, thereby allowing customers using VM apps that conform to this API to develop standard tools to interface with these apps. The nature of the query results still depends on the service implemented by the VM app. For example, a checkpointing service will likely return a VM image, while an anti-virus will return a file with the results of a scan. Nevertheless, customers often have common requirements that can be standardized as part of this API. For example, customers may require a secure interface to retrieve query results; therefore, the API could support a cryptographic interface to communicate with VM apps.

Plumbing I/O

Virtualized architectures, such as Xen and KVM, offer both paravirtualized and emulated devices. On paravirtualized platforms, the split driver model runs a backend driver in the management VM and a frontend driver in each customer VM. For unmodified guest VMs (i.e., no paravirtualization), the management VM runs code to emulate all guest I/O with devices. Device emulation induces significant overhead, thereby driving most major operating system vendors to create paravirtualized versions.

Virtualization-based public cloud environments direct all customer VM I/O through the management VM. This architecture therefore does not allow customers to manipulate their I/O in arbitrary ways. For example, a customer cannot direct its traffic to a firewall VM app before sending it to the management VM. Similarly, the I/O architecture does not allow disk reads/writes to pass through a storage IDS app before going to the disk.

To support a diverse set of VM apps, cloud providers must allow customers to customize the plumbing of the I/O paths to achieve desired goals. For example, customers should be able to advertise a network firewall VM app as the backend for their work VMs, so that all work VM packets traverse the firewall. Packets, however, must reach to the real network interface card, which is under the control of the management VM. The backend driver executing within the management VM must therefore serve I/O requests from the VM app. This setting would allow packets from the VM app to traverse via the management VM and then outside the machine (as shown in FIG. 2).

Migration

Migration of a VM involves moving a running VM from a source physical hardware platform to a target platform. This operation can be performed via suspend and resume or on "live" VMs. A standalone app VM is also a customer's work VM, hence existing mechanisms developed for migration also apply to such VM apps.

The other classes of VM apps, however, require the development of novel migration techniques. Cooperative, service, and bundled VM apps operate upon other VMs belonging to the customer. If the cloud provider decides to migrate a customer VM that is being serviced by a VM app, both VMs would have to be migrated to maintain the service. For example, a network firewall VM app protects a customer's work VM by inspecting incoming and outgoing flows. If the VM app is not migrated along with the work VM, the work VM will execute unprotected during that period. To be able to provide complete security, both app and work VMs need to be migrated together. Note that a single VM app (such as a firewall) may service multiple customer VMs, only some of which may be migrated; in such cases, the VM app may need to be replicated on both the source and target platforms.

Design Space

In this section, various design options for rich VM apps are discussed. As noted in the requirements section, VM apps must have the ability to perform privileged system tasks on customer VMs. Stock virtual machine monitors do not grant user domains such privileges. The presently described designs therefore either require modifications to virtual machine monitors, or support for nested virtualization. This discussion evaluates several designs with respect to three metrics:

(1) Performance: What is the runtime performance overhead imposed by the design? Note that the use of VM apps may intrinsically reduce the performance of customer VMs, e.g., the use of a NIDS or a firewall VM app will necessarily reduce the throughput of a network-bound customer VM because of the additional network element introduced in the I/O path. In evaluating performance, this intrinsic overhead is ignored. Rather, the discussion focuses on the overhead introduced by the implementation technique used to build VM apps.

(2) Deployability: Does the design require invasive changes to virtual machine monitors, as deployed by cloud providers today?

(3) Capability: How easily can the design realize the kinds of VM apps described above?

Table I summarizes the merits of the designs discussed below using these metrics:

TABLE I

| Design | Performance | Deployability | Capability |
| --- | --- | --- | --- |
| VMM Modification | Best | Poor | Best |
| Nested Virtualization | Good | Good | Good |
| Paravirtual-based Nesting | Good | Best | Good |

Virtual Machine Monitor Modification

Figure 3A:
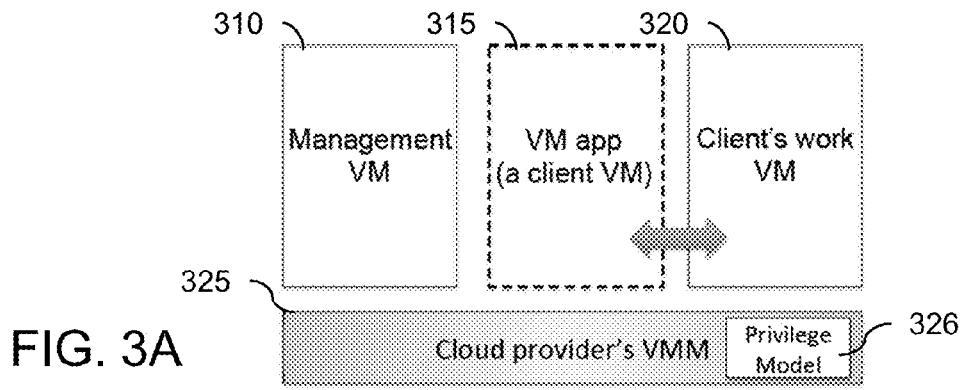
FIG. 3A is a schematic diagram illustrating a VMM modification implementation option according to one embodiment of the disclosure.

Perhaps the most straightforward approach to realizing rich VM apps is to modify the virtual machine monitor (VMM), as shown in FIG. 3A. These modifications primarily address the way in which a privilege model 326 of the VMM 325 assigns privileges to customer VMs 315, 320. On commodity VMMs, the management VM runs at the highest privilege level, and orchestrates all communication between VMs running as user domains. In the commodity model, communication between VMs belonging to a single customer goes through the management VM.

The proposed modifications to the VMM 325 will change its privilege model 326, and allow a VM 320 belonging to a single customer to delegate specific privileges to VM apps; e.g., it will allow a cooperative VM app 315 (executing with the customer's credentials) to map memory pages belonging to the customer's VM 320. Further, cloud platforms do not currently permit customers to advertise a VM other than the management VM as an I/O backend of their work VMs. To allow this, changes must be implemented in the VM instantiation protocol, to take input from customers on their preferred I/O backend (default would be the management VM). That design would permit customers to plumb I/O paths of their VM at will, thereby allowing the implementation of service and bundled VM apps.

Modifications to change a privilege model in Xen are described in S. Butt, A. Lagar-Cavilla, A. Srivastava, and V. Ganapathy, Self-Service Cloud Computing, ACM CCS, 2012. That work introduces a new self-service cloud computing model, in which each customer's VMs are logically grouped together into a single meta-domain. Each meta-domain has its own administrative interface, which in turn can assign privileges to individual VMs to communicate with each other. Those changes were implemented in Xen using the Xen Security Modules (XSM) framework. XSM is a generalized mandatory access control interface that allows the creation of custom security functionality within Xen. It does so by placing a set of hooks at specific locations within Xen, and offering the flexibility of customizing their implementation. Extensions to Xen's privilege model 326 can simply be implemented as a code module containing callbacks to be invoked by specific hooks.

The VMM modification design may be evaluated using the three criteria described above with reference to Table I:

(1) Performance: It is expected that the runtime performance impact of this approach is be minimal. The performance overhead will likely stem from the impact of executing additional checks, e.g., as implemented in the XSM module that implements the privilege model. VM apps and customer VMs continue to execute directly atop the modified VMM, and their performance will likely be comparable to VMs executing atop an unmodified VMM.

(2) Capability: The VMM can easily be modified to admit the implementation of all four kinds of VM apps described above (standalone, cooperative, service and bundled). In particular, this design eases the creation of bundled VM apps, because customers can plumb I/O paths of their VMs at will, thereby allowing the output of one VM app to be fed as input to another. Therefore, this design option permits realization of the model of rich cloud app markets.

(3) Deployability: Unfortunately, this design option is also the most difficult one to deploy. Because it involves VMM modifications, existing cloud providers must be willing to adopt the required changes to their platforms.

Nested Virtualization

Figure 3B:
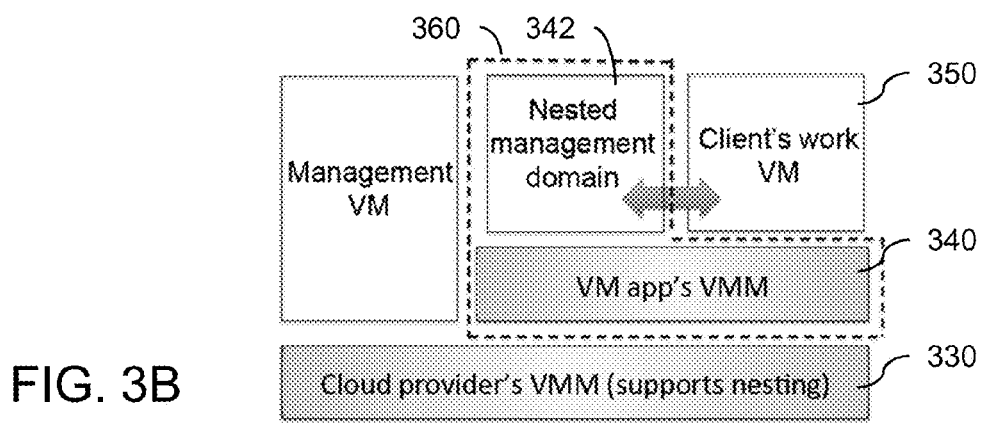
FIG. 3B is a schematic diagram illustrating a nested virtualization implementation option according to one embodiment of the disclosure.

Hardware support for virtualization, coupled with software-level implementation tricks, have made low-overhead nested virtualization a reality. As shown in FIG. 3B, nested virtualization allows customers to execute a full-fledged VMM 340 (a nested VMM) atop a base VMM 330 that has been modified to support nesting. Customers can execute their work VMs 350 atop the nested VMM 340, which in turn has its own management VM 342. Thus, customers can implement privileged services within the management VM 342 of the nested VMM 340 without relying on the cloud provider to do so. In this model, the VM app 360 may be distributed as a VMM 340 together with a management VM 342 that implements the advertised functionality of the app. The customer executes his work VM 350 atop this VMM, which itself executes on the cloud provider's VMM 330.

The nested virtualization design may also be evaluated using the three criteria described above with reference to Table I:

(1) Performance: It is expected that the performance overhead of VM apps implemented using this technique will be acceptable, although the overhead will be higher than the previous approach involving VMM modifications. The primary source of overhead is that traps from the customer VM must be handled both by the base VMM and the nested VMM. That overhead increases exponentially with the number of nesting levels.

(2) Deployability: This design is easily deployable over cloud platforms that support nested virtualization. For example, this design is directly applicable to OpenStack-based cloud platforms that are built atop KVM.

(3) Capability: This design easily accommodates the first three kinds of VM apps described above. However, it does not support easy creation of bundled VM apps. For example, suppose that two VM apps are implemented, one to create VM checkpoints, and a second to encrypt disk storage. In the nested VM app design, it is not as straightforward to compose these VM apps to build a bundled app that creates encrypted checkpoints. That is because the services are implemented within the management VM of the nested VMM. Creating a bundled VM app would involve composing the functionality of the user-level utilities within the nested management VM.

Paravirtualization-Based Nesting

Figure 3C:
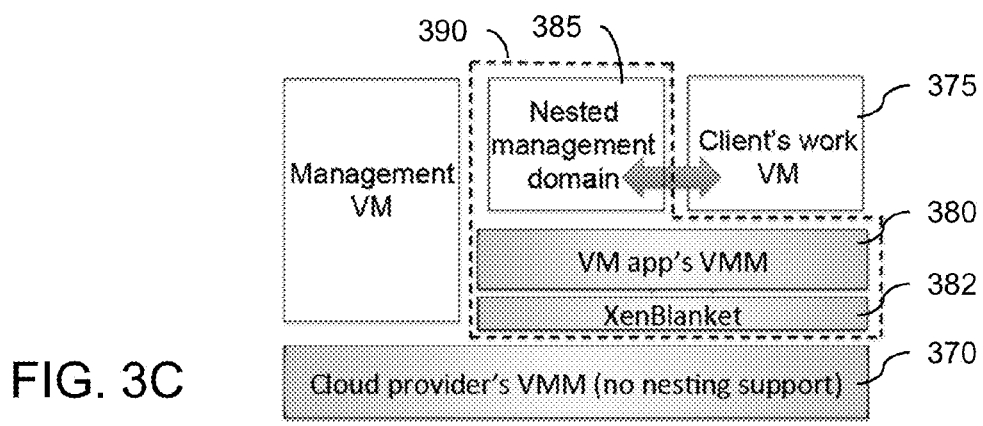
FIG. 3C is a schematic diagram illustrating a paravirtualization implementation option according to one embodiment of the disclosure.

The third design option, shown in FIG. 3C, is a variant of the nested virtualized-based design described above. If the cloud provider's platform is based upon a VMM 370 that does not have hardware support for efficient nested virtualization, it may still be possible to achieve many of the same benefits using paravirtualization. In particular, the XenBlanket project (described by D. Williams, H. Jamjoom, and H. Weatherspoon, The Xen-Blanket: Virtualize Once, Run Everywhere, in ACM EuroSys, April 2012) demonstrates that it is possible to achieve nested virtualization atop a stock Xen VMM (e.g., as deployed on Amazon EC2) that does not support virtualization. The XenBlanket virtualization layer, or a similar virtualization layer 382, achieves this by building a thin software layer (a "blanket") that emulates privileged operations for a nested VMM 380 executing atop the base Xen VMM 370.

Rather than relying on the cloud provider to adapt the cloud provider VMM to support nesting, the XenBlanket virtualization layer, or a similar virtualization layer 382, provides a second-level hypervisor through paravirtualization. The virtualization layer interacts with paravirtualized device interfaces.

VM apps based upon this design option will resemble those developed for the previous design option. The principal difference is that the software stack 385 of these VM apps 390 and the customer VMs 375 must use a paravirtualized operating system. This design is now evaluated using above metrics:

(1) Performance: the XenBlanket virtualization layer was primarily developed to allow nested virtualization atop commodity cloud platforms. Although the reported overhead of the blanket layer is acceptable, the overheads of a VM app implemented using this approach will likely be higher than if support for nested virtualization was available. Among the described design options, it is therefore expected that this approach will have the highest runtime overheads.

(2) Deployability: the XenBlanket virtualization layer was developed with the primary aim of easy deployment over commodity clouds. Therefore VM apps developed using this approach can be deployed today over services such as Amazon EC2.

(3) Capability: As with the previous design option, the XenBlanket virtualization layer based approach can easily support standalone, service and cooperative VM apps. VM apps cannot be composed easily, and a bundled VM app can best be created by composing the functionality of user-level applications within the nested management VM.

Hybrid Designs

Finally, it may be possible to create a hybrid design for a VM app that combines the designs discussed above. For example, suppose that a cloud provider decides to incorporate modifications to allow customers to plumb their I/O paths, in effect allowing customers to place middlebox VM apps between their work VMs and the platform's management VM. The cloud provider may, however, be reluctant to include VMM modifications that allow VM apps to map memory pages of customer VMs. In such cases, it is still possible to realize VM apps such as rootkit detectors using nested virtualization using either the second or the third design options.

System

Figure 4:
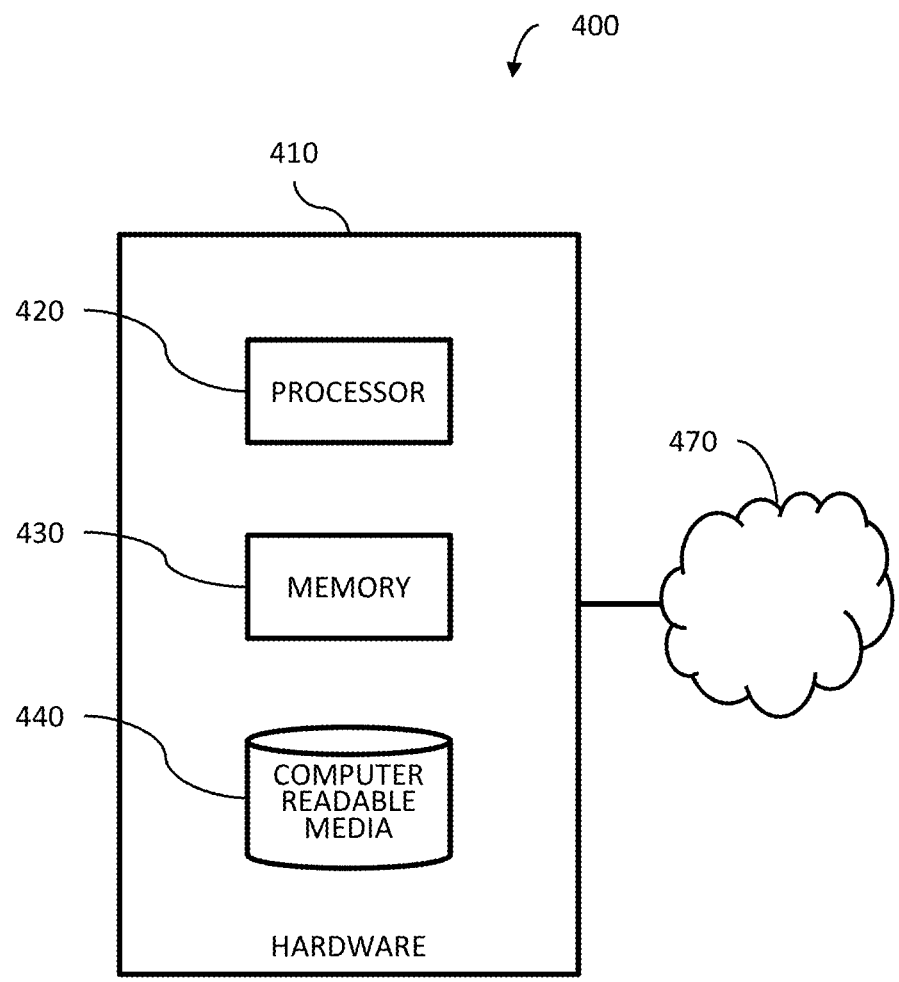
FIG. 4 is a schematic diagram illustrating a computer system used in implementing one embodiment of the disclosure.

The elements of the methodology as described above may be implemented in computer hardware comprising a plurality of units linked by a network or a bus. For example, the hypervisors, virtual machines and apps described above, as well as systems for automatically marketing and distributing those elements, may be instantiated using computing systems such as the exemplary computing system 400 is shown in FIG. 4.

A computing apparatus 410 may be a mainframe computer, a desktop or laptop computer or any other device or group of devices capable of processing data. The computing apparatus 410 receives data from any number of data sources that may be connected to the apparatus. For example, the computing apparatus 410 may receive input from a wide area network 470 such as the Internet, via a local area network or via a direct bus connection.

The computing apparatus 410 includes one or more processors 420 such as a central processing unit (CPU) and further includes a memory 430. The processor 420 is configured using software according to the present disclosure.

The memory 430 may include a random access memory (RAM) and a non-volatile memory such as an electrically erasable programmable read-only memory (EEPROM). The memory may also include removable media such as a disk drive, tape drive, memory card, etc., or a combination thereof. The RAM functions as a data memory that stores data used during execution of programs in the processor 420; the RAM is also used as a program work area. The EEPROM functions as a program memory for storing a program executed in the processor 420. The program may reside on the EEPROM or on any other tangible, non-volatile computer-readable media 440 as computer readable instructions stored thereon for execution by the processor to perform the operations.

Generally, the processor 420 is configured with program modules that include routines, objects, components, data structures and the like that perform particular tasks or implement particular abstract data types. The term "program" as used herein may connote a single program module or multiple program modules acting in concert. The disclosure may be implemented on a variety of types of computers, including personal computers (PCs), hand-held devices, multi-processor systems, microprocessor-based programmable consumer electronics, network PCs, mini-computers, mainframe computers and the like, and employs a distributed computing environments, where tasks are performed by remote processing devices that are linked through a communications network. In a distributed computing environment, modules may be located in both local and remote memory storage devices.

An exemplary processing module for implementing the methodology above may be stored in a separate memory that is read into a main memory of a processor or a plurality of processors from a computer readable medium such as a ROM or other type of hard magnetic drive, optical storage, tape or flash memory. In the case of a program stored in a memory media, execution of sequences of instructions in the module causes the processor to perform the process operations described herein. The embodiments of the present disclosure are not limited to any specific combination of hardware and software and the computer program code required to implement the foregoing can be developed by a person of ordinary skill in the art.

The term "computer-readable medium" as employed herein refers to a tangible, non-transitory machine-encoded medium that provides or participates in providing instructions to one or more processors. For example, a computer-readable medium may be one or more optical or magnetic memory disks, flash drives and cards, a read-only memory or a random access memory such as a DRAM, which typically constitutes the main memory. The terms "tangible media" and "non-transitory media" each exclude propagated signals, which are not tangible and are not non-transitory. Cached information is considered to be stored on a computer-readable medium. Common expedients of computer-readable media are well-known in the art and need not be described in detail here.

Pre-configured software and technical services in the form of cloud apps, available via cloud markets, are surging. The model adopted by existing cloud market is restrictive. Presently described is a cloud app market that supports the creation of standard utilities such as firewalls, NIDS, storage encryption, and VMI-based security tools, and allows customers to link them with their work VMs. To that end, potential cloud apps were categorized into four categories and the key requirements were described to realize them in today's public cloud environments. The design space required to actually implement rich VM apps was explored.

The forgoing detailed description is to be understood as being in every respect illustrative and exemplary, but not restrictive, and the scope of the disclosure herein is not to be determined from the description, but rather from the claims as interpreted according to the full breadth permitted by the patent laws. It is to be understood that various modifications will be implemented by those skilled in the art, without departing from the scope and spirit of the disclosure.

What is claimed is:

1. A method for implementing a cloud-based app market, comprising:
by a cloud infrastructure provider, advertising a functionality of a virtual machine app for performing a service in connection with a customer work virtual machine under control of a cloud infrastructure customer;

by the cloud infrastructure provider, distributing the virtual machine app via a cloud infrastructure customer download, the virtual machine app comprising:
   a customer virtual machine monitor for use by the cloud infrastructure customer in executing the customer work virtual machine, the customer virtual machine monitor being nested on a provider virtual machine monitor, and
   a customer management virtual machine executing on the customer virtual machine monitor, the customer management virtual machine permitting implementation of privileged services by the cloud infrastructure customer;
   the virtual machine app having privileges for accessing privileged information from the work virtual machine, the virtual machine app containing a virtual machine app operating system separate from an operating system of the work virtual machine, the virtual machine app further containing instructions for performing a service based on the privileged information from the work virtual machine;
by the cloud infrastructure provider, providing a provider management virtual machine executing on the provider virtual machine monitor, the provider management virtual machine disallowing interaction between the customer virtual machine monitor and virtual machine monitors of other cloud infrastructure customers nested on the provider virtual machine monitor; and
disallowing sharing of any data between the virtual machine app and the provider management virtual machine.

2. The method of claim 1 wherein the provider virtual machine monitor provides hardware level support for nesting and the customer virtual machine monitor executes on the provider virtual machine monitor.

3. The method of claim 1 wherein the provider virtual machine monitor does not provide hardware level support for nesting and the customer virtual machine monitor executes on a second-level virtualization layer that executes on the provider virtual machine monitor and emulates privileged operations for the customer virtual machine monitor.

4. The method of claim 3 wherein the second-level virtualization layer is a driver for interacting with paravirtualized device interfaces.

5. The method of claim 1 wherein the instructions for performing a service based on the privileged information from the work virtual machine comprise instructions for conducting two-way communication between the work virtual machine and the virtual machine app.

6. The method of claim 5 wherein the instructions comprise instructions for performing a service selected from a group consisting of a checkpointing service, an antivirus service and an intrusion detection service.

7. The method of claim 1, wherein the instructions for performing a service based on the privileged information from the work virtual machine comprise instructions for operating on an output of the work virtual machine.

8. The method of claim 7 wherein the instructions comprise instructions for performing a service selected from a group consisting of a forensic analysis service and a network security service.

9. The method of claim 1 wherein disallowing the sharing of any data between the virtual machine app and the provider management virtual machine comprises using grant tables to disallow the establishment of shared pages between the virtual machine app and the provider management virtual machine.

10. Computer readable media comprising one or more storage devices, the computer readable media having stored thereon computer readable instructions for execution by processors in a cloud infrastructure provided by a cloud infrastructure provider, wherein execution of the computer readable instructions causes the processors to perform operations comprising:
   advertising a functionality of a virtual machine app for performing a service in connection with a customer work virtual machine under control of a cloud infrastructure customer;
   distributing the virtual machine app via a cloud infrastructure customer download, the virtual machine app comprising:
     a customer virtual machine monitor nested on a provider virtual machine monitor, the customer work virtual machine being under control of the cloud infrastructure customer and executing on the customer virtual machine monitor;
     a customer management virtual machine executing on the customer virtual machine monitor, the customer management virtual machine permitting implementation of privileged services by the cloud infrastructure customer;
     the virtual machine app having privileges for accessing privileged information from the work virtual machine, the virtual machine app containing a virtual machine app operating system separate from an operating system of the work virtual machine, the virtual machine app further containing instructions for performing a service based on the privileged information from the work virtual machine;
   instantiating a provider management virtual machine executing on the provider virtual machine monitor, the provider management virtual machine disallowing interaction between the customer virtual machine monitor and virtual machine monitors of other cloud infrastructure customers nested on the provider virtual machine monitor; and
   disallowing sharing of any data between the virtual machine app and the provider management virtual machine.

11. The computer readable media of claim 10 wherein the provider virtual machine monitor provides hardware level support for nesting and the customer virtual machine monitor executes on the provider virtual machine monitor.

12. The computer readable media of claim 10 wherein the provider virtual machine monitor does not provide hardware level support for nesting and the customer virtual machine monitor executes on a second-level virtualization layer that executes on the provider virtual machine monitor and emulates privileged operations for the customer virtual machine monitor.

13. The computer readable media of claim 12 wherein the second-level virtualization layer is a driver for interacting with paravirtualized device interfaces.

14. The computer readable media of claim 10 wherein the instructions for performing a service based on the privileged information from the work virtual machine comprise instructions for conducting two-way communication between the work virtual machine and the virtual machine app.

15. The computer readable media of claim 14 wherein the instructions comprise instructions for performing a service selected from a group consisting of a checkpointing service, an antivirus service and an intrusion detection service.

16. The computer readable media of claim 10, wherein the instructions for performing a service based on the privileged information from the work virtual machine comprise instructions for operating on an output of the work virtual machine.

17. The computer readable media of claim 16 wherein the instructions comprise instructions for performing a service selected from a group consisting of a forensic analysis service and a network security service.

18. The computer readable media of claim 10 wherein disallowing the sharing of any data between the virtual machine app and the provider management virtual machine comprises using grant tables to disallow the establishment of shared pages between the virtual machine app and the provider management virtual machine.

* * * * *